(12) United States Patent
Cothran et al.

(10) Patent No.: US 7,744,988 B2
(45) Date of Patent: Jun. 29, 2010

(54) COMPOSITES CONTAINING CROSSLINKABLE THERMOPLASTIC AND TPV SHOW LAYER

(75) Inventors: Liggett Cothran, Lambertville, MI (US); Henry Kim, Canton, MI (US); Timothy N. Pauli, Stratford (CA)

(73) Assignee: Cooper-Standard Automotive Inc., Novi, MI (US)

( * ) Notice: Subject to any disclaimer, the term of this patent is extended or adjusted under 35 U.S.C. 154(b) by 0 days.

(21) Appl. No.: 11/967,468

(22) Filed: Dec. 31, 2007

(65) Prior Publication Data

US 2008/0102288 A1      May 1, 2008

Related U.S. Application Data

(63) Continuation of application No. 10/950,826, filed on Sep. 27, 2004, now abandoned, which is a continuation-in-part of application No. 09/912,099, filed on Jul. 24, 2001, now Pat. No. 6,828,011.

(51) Int. Cl.
| | |
|---|---|
| B32B 27/32 | (2006.01) |
| B32B 17/10 | (2006.01) |
| B32B 9/06 | (2006.01) |
| B32B 27/00 | (2006.01) |
| B32B 27/08 | (2006.01) |

(52) U.S. Cl. .............. 428/220; 428/332; 428/337; 428/339; 428/447; 428/500; 428/515; 428/923; 428/926

(58) Field of Classification Search .............. None
See application file for complete search history.

(56) References Cited

U.S. PATENT DOCUMENTS

| | | | |
|---|---|---|---|
| 3,067,455 A | 12/1962 | Reid | |
| 3,177,534 A | 4/1965 | Millhouse et al. | |
| 3,333,381 A | 8/1967 | Stark et al. | |
| 3,646,155 A | 2/1972 | Scott | |
| 3,825,459 A | 7/1974 | Taylor | |
| 4,381,273 A | 4/1983 | Azzola | |
| 4,411,941 A | 10/1983 | Azzola | |
| 4,513,044 A | 4/1985 | Shigeki et al. | |
| 4,668,556 A | 5/1987 | Hermann et al. | |
| 4,859,391 A | 8/1989 | Jackson | |
| 4,913,976 A | 4/1990 | Brooks et al. | |
| 4,923,759 A | 5/1990 | Brooks et al. | |
| 4,936,126 A | 6/1990 | Sato | |
| 4,975,306 A | 12/1990 | Jackson | |
| 4,994,311 A | 2/1991 | Junker | |
| 5,183,613 A | 2/1993 | Edwards | |
| 5,221,564 A | 6/1993 | Keys | |
| 5,279,782 A | 1/1994 | Yamamoto et al. | |
| 5,411,785 A | 5/1995 | Cook | |
| 5,415,822 A | 5/1995 | Cook | |
| 5,635,274 A | 6/1997 | Chihara et al. | |
| 5,686,165 A | 11/1997 | Cook | |
| 5,736,215 A | 4/1998 | Buchholz et al. | |
| 5,753,063 A | 5/1998 | Sakakibara et al. | |
| 6,012,760 A | 1/2000 | Nozaki | |
| 6,024,906 A | 2/2000 | Cook | |
| 6,099,676 A | 8/2000 | Hayashi | |
| 6,110,546 A * | 8/2000 | Honda et al. | ............... 428/31 |
| 6,245,409 B1 | 6/2001 | Cook | |
| 6,828,011 B2 * | 12/2004 | Yu et al. | ............... 428/220 |
| 2003/0021986 A1 | 1/2003 | Yu et al. | |

FOREIGN PATENT DOCUMENTS

| | | |
|---|---|---|
| GB | 1 242 436 | 8/1971 |
| GB | 1 545 511 | 5/1979 |

OTHER PUBLICATIONS

Allock, et al., *Contemporary Polymer Chemistry*, 2d Edition, Prentice Hall, Englewood Cliffs, NJ, 1990, p. 10.
Stevens, *Polymer Chemistry, an Introduction*, 3d Edition, Oxford University Press, 1999, pp. 235-236.

* cited by examiner

*Primary Examiner*—Sheeba Ahmed
(74) *Attorney, Agent, or Firm*—Fay Sharpe LLP

(57) ABSTRACT

Methods for forming a composite for use as a vehicle weather strip and the products formed thereby are disclosed in which a main body member is formed from an elastomer polymer and an abrasion resistant decorative layer including a blend of a crosslinkable thermoplastic polyolefin and a thermoplastic vulcanizate is applied thereon. The crosslinkable thermoplastic polyolefin preferably includes a crosslinkable olefin homopolymer. The olefin homopolymer preferably contains grafted silane functional groups to allow the material to be crosslinked in the presence of moisture. The abrasion resistant decorative layer may be extruded or otherwise applied onto the main body either prior to or after the main body member is cured and either prior to or after the crosslinkable polyolefin of the abrasion resistant decorative layer is crosslinked. The material of the abrasion resistant decorative layer may be extruded into sheet form and laminated onto the main body member.

14 Claims, 5 Drawing Sheets

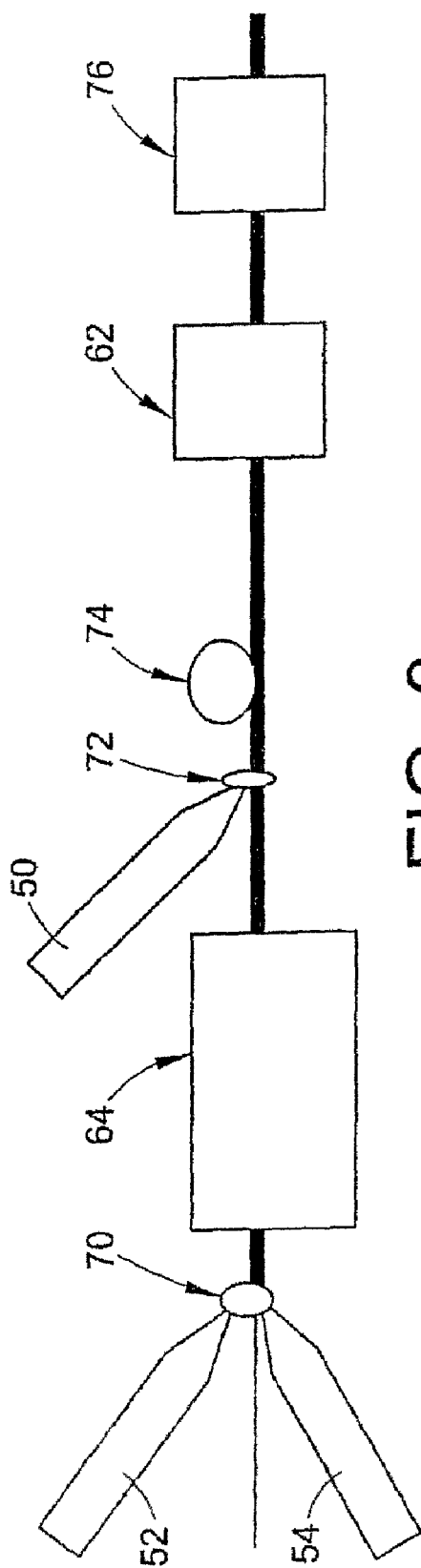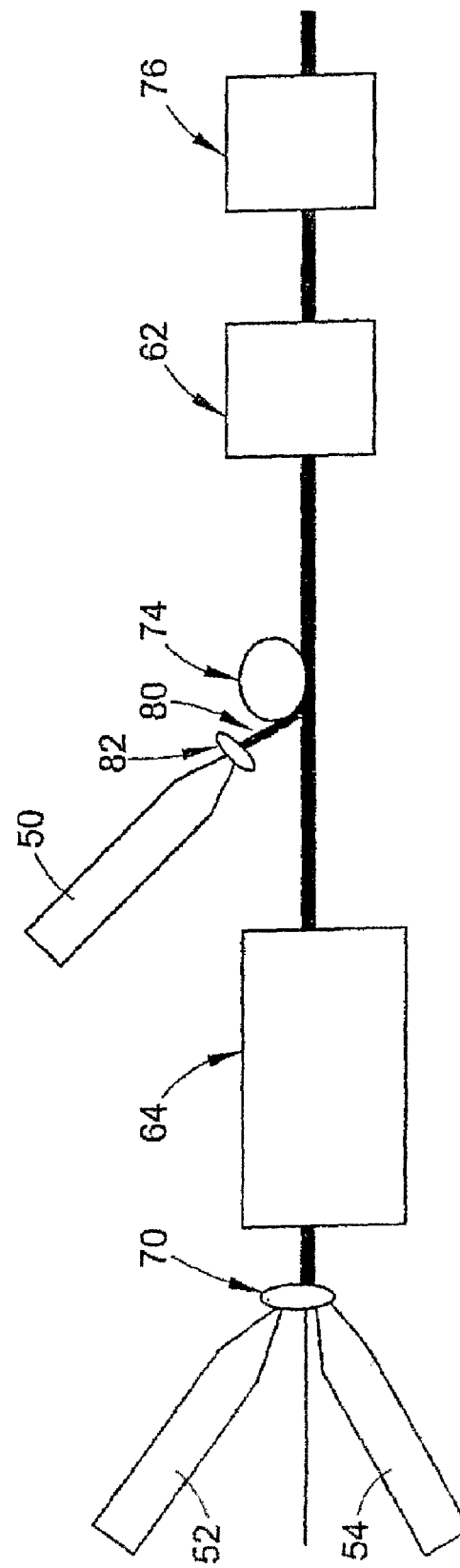

COMPOSITES CONTAINING CROSSLINKABLE THERMOPLASTIC AND TPV SHOW LAYER

The present application is a continuation of U.S. application Ser. No. 10/950,826, filed Sep. 27, 2004 now abandoned, the disclosure of which is incorporated herein by reference, which was a continuation-in-part application of U.S. Ser. No. 09/912,099, filed Jul. 24, 2001 now U.S. Pat. No. 6,828,011.

BACKGROUND

The present exemplary embodiments relate to a process for forming molded or extruded composites and the products formed thereby, particularly automobile weather strips. They finds particular application in conjunction with vehicle weather strip composites comprised of an elastomeric polymer and a show layer including a thermoplastic vulcanizate and a crosslinked thermoplastic polyolefin, and will be described with particular reference thereto. However, it is to be appreciated that the present exemplary embodiments are also amenable to other like applications.

It is common in the motor vehicle industry to fashion decorative abrasion resistant sections for various parts of an automobile by extruding or molding such sections from certain thermosetting polymeric materials. Examples of typical abrasion resistant sections manufactured by such a process include colored weather strips. These weather strips are mounted on an automobile door surface and along the perimeter of automobile doors to provide a seal between the door and the automobile body as well as to protect both the door and exterior objects when they come in contact with each other. Weather strips are typically molded or extruded and attached to a vehicle by an adhesive tape or by mechanical means such as by crimping or the use of fasteners.

Various thermoset elastomeric rubber materials, such as ethylene propylene diene terpolymer (EPDM), styrene-butadiene copolymer (SBR) and chloroprene rubbers have been commonly used to form these weather strips. These materials are favored by manufacturers because they are relatively inexpensive compared to thermoplastics and generally exhibit both the desired flexibility necessary for providing an effective seal and acceptable weatherability properties. However, these elastomers typically lack the low-friction, abrasion resistance, and weatherability that is necessary at the point of contact with the exterior for extended life of the weather strips. In addition, it is difficult to impart desirable surface color and gloss to such materials.

Manufacturers have therefore attempted a variety of approaches to improve the wear resistance, aesthetics and other properties of elastomeric sealing sections. One strategy for weather strips has been to apply a second layer of low friction polymer to selected surfaces of the elastomeric weather strip, particularly along an area that is exposed to the exterior. Incorporated within the second layer can be various pigments or dyes such that the surface of the weather strip matches the color of the automobile.

Depending on the composition of the main body of the weather strip, this second layer is often formed from polyvinyl chloride (PVC) or an uncured non-polar thermoplastic elastomer, such as polypropylene or polyethylene. These second layers are usually applied directly to the weather strip surface by lamination or as a solvent-based spray, or after an application of a primer or adhesive layer to the elastomer. However, these methods are not completely satisfactory. In addition to longer processing time and added material cost, it is difficult to obtain a satisfactory bond between the elastomer and the surface coating. Sprayed on coatings are prone to cracking while an adhered layer is susceptible to peeling.

Another method that manufacturers have used to adhere the second layer to the extruded weather strip is to cohesively bond a layer of wear resistant thermoplastic to the weather strip. Several techniques have been developed to accomplish this. According to one method, the elastomer rubber and the second layer are co-extruded. The resulting composite is then passed through an oven in which the elastomer rubber is cured and the interface between the second layer and the rubber is heated to such a degree that the second layer partially melts, causing it to adhesively bond with the rubber. Alternately, the rubber is extruded first and passes through an oven in which it is at least partially cured. A molten thermoplastic is then extruded onto the vulcanized rubber. The residual heat of the rubber as it emerges from the oven promotes interdiffusion of the two layers at the interface between the two, forming a bond between the two materials.

Due in part to the uncrosslinked nature of the thermoplastic, however, it is difficult to control exactly the degree of melting that the second layer undergoes in this technique. If the second layer melts too much, the abrasion resistance it affords may be compromised and its aesthetic appeal diminished. Thus, there is a need for a new vehicle weather strip composite that overcomes the deficiencies and limitations of the prior art.

BRIEF SUMMARY OF THE INVENTION

In a first embodiment, there is provided a process for forming a composite automobile weather strip including a main body member of elastomeric polymer and an abrasion resistant decorative layer, the abrasion resistant decorative layer including a blend of a crosslinkable polyolefin and a thermoplastic vulcanizate.

The use of a crosslinkable TPO allows a manufacturer to maintain the desirable qualities associated with thermoplastics while affording greater control of melting and alleviating other processing concerns. The crosslinkable polyolefin may contain grafted silane functional groups. In the presence of moisture, water hydrolyzes the silane. Under the action of a catalyst, the resulting silanol groups then condense to form intermolecular crosslinking sites. The thermoset elastomer rubber may be cured by sulfur or peroxide agents.

In a second embodiment, there is provided a wear resistant composite suitable for use as a vehicle weather strip including an abrasion resistant decorative layer, wherein the abrasion resistant decorative layer includes a crosslinkable olefin polymer and a thermoplastic vulcanizate, bonded to and disposed immediately adjacent an at least partially crosslinked elastomer polymer main body member.

The versatility of the abrasion resistant decorative layer allows it to be applied to the elastomer member in several ways. In a first preferred technique, the olefinic polymer/TPV blend is co-extruded with an uncured thermoset elastomer rubber main body member and then exposed to water to crosslink the olefinic polymer. The resultant composite is then passed through an oven to vulcanize the thermoset elastomer rubber main body member. In a second preferred technique, the olefinic polymer/TPV blend is step extruded onto a previously cured or partially cured thermoset elastomer rubber main body member. The crosslinkable olefinic polymer in the blend is then crosslinked by immersion in a water bath, or otherwise exposed to moisture. In a third preferred technique, the olefinic polymer/TPV blend is extruded into a sheet or tape form and laminated onto a previously cured or partially cured thermoset elastomer rubber main body member. The resulting composite is then subjected to a water bath, or otherwise exposed to moisture, to crosslink the grafted silane groups in the olefinic polymer. Alternately, the elastomer member and/or the olefinic polymer/TPV blend are molded heat bonded to each other.

While all the techniques produce acceptable results, if olefinic polymer/TPV blend is applied to the elastomer main body prior to the curing of the main body member, the olefinic polymer should preferably be crosslinked before the elastomer main body member is cured. This is to ensure that the decorative layer does not melt excessively during the subsequent heating.

BRIEF DESCRIPTION OF THE DRAWINGS

FIG. 3 is a depiction of an alternative preferred technique of the present invention for manufacturing a composite extrusion suitable for use as a weather strip for a vehicle.

FIG. 4 is a depiction of an another alternative preferred technique of the present invention for manufacturing a composite extrusion suitable for use as a weather strip for a vehicle.

DETAILED DESCRIPTION OF THE PREFERRED EMBODIMENTS

The present invention provides a variety of sealing strips, weather strips, glass run channels, etc. for vehicles. As used herein, the term "weather strip" is used to refer broadly to any such strips conventionally used in automobiles and other vehicles. Briefly, the weather strips preferably comprise at least two components, each formed from particular materials and having a unique cross-sectional configuration. A preferred weather strip comprises an elastomer polymer main body member having any of several shapes conventional in the art.

The weather strip also comprises an abrasion resistant decorative layer comprised of an abrasion resistant material disposed on the outwardly facing surface of the main body member. As explained in greater detail below, the layer preferably comprises a moisture crosslinkable olefin polymer and a thermoplastic vulcanizate.

Figure 1:
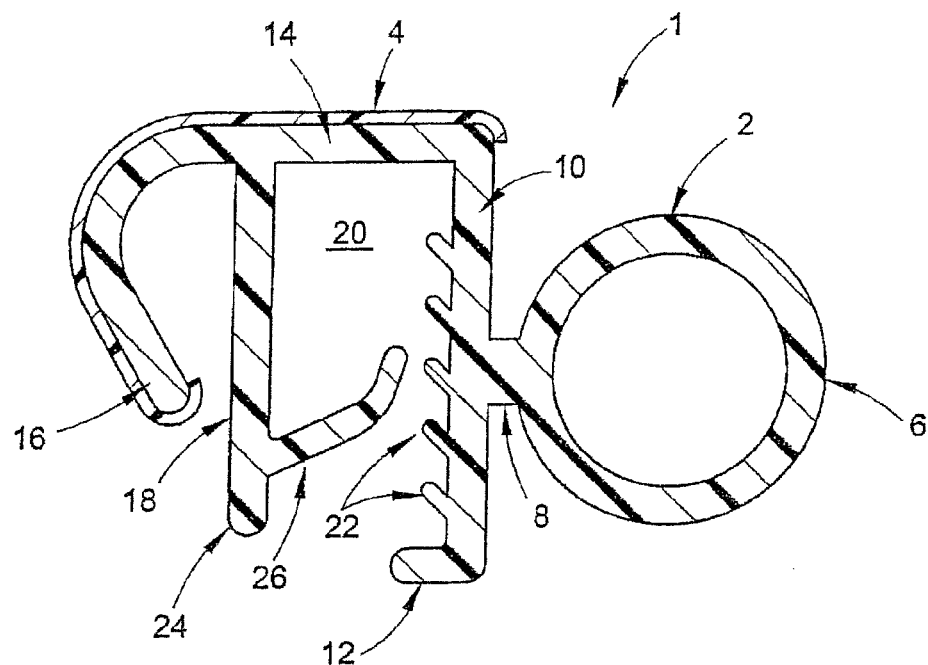
FIG. 1 is a cross section of a preferred embodiment weather strip for a vehicle in accordance with the present invention.

With reference to FIG. 1, a cross-section of a preferred embodiment weather strip for a vehicle in accordance with the present invention is shown. The preferred embodiment weather strip is comprised of a main body member 2, made from one or more of a number of elastomeric polymers known in the art to be suitable for weather strip applications, and an abrasion resistant decorative layer 4.

The elastomeric polymers suitable for use in the main body member include any conventional material used for such purposes. Thus, exemplary materials include elastomeric rubbers, as well as thermoplastic vulcanizates (TPV's) and other elastomeric polymers.

Suitable elastomeric rubber compositions for use in the main body member include, but are not limited to, ethylene-α-olefin-non-conjugated diene rubbers (EODM), styrene-butadiene rubbers (SBR), acrylonitrile-butadiene rubber, natural or synthetic isoprene rubber and chloroprene rubber. EODM rubbers are preferred due to their oxygen, ozone and weather resistance. Suitable α-olefins include, but not limited to, propylene, 1-butene, 1-pentene, 1-hexene, 1-octene and 1-decene. A preferred α-olefin is propylene. A preferred group of EODM compounds suitable for the present invention are ethylene-propylene-diene terpolymers (EPDM). Suitable non-conjugated dienes include, but not limited to, 1,4-hexadiene, dicyclopentadiene and 5-ethylidene-2-norbornene. A preferred EODM for the main body member of the weather strip of the present invention is ethylene-propylene-ethylidene-norbornene terpolymer or ethylene-propylene-dicyclopentadiene terpolymer. Various grades of elastomer thermoset rubber may be used in the invention including dense elastomers and less dense, sponge elastomers.

The elastomer of the main body member can further include various additives known in the art in such concentrations that do not adversely affect the properties of the compound. Such additives include, but are not limited to, vulcanization agents, carbon black, lubricants, plasticizers, fillers, slip agents, processing oils and antioxidants. These additives are added to the elastomer prior to formation of the main body member.

In one preferred embodiment (FIG. 1), the main body member 2 is formed having a hollow tube 6 joined along its longitudinal axis at a region 8 on its outer circumference to a tangential wall 10. Attached to one end of the tangential wall is a retention spur 12. Attached to an opposite end of the tangential wall is a second wall 14. The second wall 14 is substantially perpendicular to the tangential wall 10 at the junction between them, but gently curls back toward the tangential wall as the second wall 14 extends from the tangential wall 10. The second wall 14 terminates at and defines its distal end 16 as shown in FIG. 1. Approximately midway between the junction of the tangential wall 10 and the second wall 14, and the distal end 16 of the second wall 14, a third wall 18 substantially parallel to the tangential wall 10 extends from the second wall 14. Together, the tangential wall 10, the second wall 14 and the third wall 18 define an interior chamber 20. Projecting from the tangential wall 10 on an opposite side from the hollow tube 6 are a plurality of sealing lips 22 that extend inward and upward therefrom toward the interior chamber 20. Attached to a distal end 24 of the third wall 18 and projecting inward and upward therefrom toward the interior chamber 20 is a large sealing lip 26. Depending on the function of the weatherstrip, the make of the automobile, the shape of the chassis and doorframe, many alternative embodiments are also contemplated.

Irrespective of the exact shape of the main body member, applied to an exteriorly directed surface (not numbered) of the second wall 14 of the main body member 2 is the abrasion resistant decorative layer 4 comprised of a crosslinkable olefin polymer and a thermoplastic vulcanizate. This abrasion resistant decorative layer 4 is applied along the main body member at those areas that contact the door, vehicle frame or exterior objects (not pictured) to improve the wear resistance and aesthetics of the weather strip at those locations. In addition, the abrasion resistant decorative layer 4 may be applied to other areas of the main body member 2 that contact these objects for added protection and scuff resistance, such as the various surfaces of the main body member (not numbered) that are exposed to and face the interior chamber 20.

Thermoplastic vulcanizates (TPV's) are polyolefinic matrices, preferably crystalline, through which thermoset elastomers are generally uniformly distributed. Examples of thermoplastic vulcanizates include EPM and EPDM thermoset materials distributed in a crystalline polypropylene matrix. Any conventional TPV having the desired weatherability, flexibility and strength may be used in the present invention. Although not intended to be limiting, examples of suitable TPVs for use in the present invention include those prepared by blending an olefinic thermoplastic and either an ethylene copolymer or terpolymer, such as disclosed in U.S. Pat. No. 4,990,566 to Hert, or a nitrile rubber, such as disclosed in U.S. Pat. No. 4,591,615 to Aldred et al, the disclosure of both of which are incorporated herein by reference.

Commercial TPV's are typically based on vulcanized rubbers in which a phenolic resin, sulfur or peroxide cure system is used to vulcanize, that is crosslink, a diene (or more generally, a polyene) copolymer rubber by way of dynamic vulcanization, which is a process in which the rubber is crosslinked while mixing (typically vigorously), in a thermoplastic matrix. Although any cure system is contemplated by the present embodiments, sulfur is typically preferred over peroxide free radical or a phenolic resin cure systems because peroxide may degrade and/or crosslink the polypropylene or polyethylene thermoplastic as well as the rubber. This is in turn limits the extent of rubber crosslinking that can occur before the entire mixture degrades or crosslinks and is no longer thermoplastic, while phenolic cure systems may cause a yellowish tint to the final product.

Two examples of preferred commercial TPV's are SANTOPRENE® thermoplastic rubber, which is manufactured by Advanced Elastomer Systems and SARLINK®, available from DSM Elastomers, both of which are a mixture of crosslinked EPDM particles in a crystalline polypropylene matrix. These materials have found utility in many applications which previously used vulcanized rubber, e.g. hose, gaskets, and the like. TPV's are noted for their processability as thermoplastics while retaining the excellent resilience and compression set properties of vulcanized rubbers.

A preferred method of preparing a thermoplastic vulcanizate known by those skilled in the art is to form an admixture of non-crosslinked elastomeric polymer and polyolefin resin and curing agent. The admixture is then masticated at a vulcanization temperature. Preferably the non-crosslinked polymer and polyolefin are intimately mixed before a curing agent is added. When prepared in a conventional mixing apparatus such as a multiple-roll mill, Banbury or Brabender mixer or mixing extruder, this is known as a "two-pass" cycle. Additional additives may be added, including, but not limited to those fillers, fire retardants, stabilizers, pigments and antioxidants described above with respect to the TPO layer.

Various fillers and processing materials as well as other components may be added to the TPV used in the present invention. Non-limiting examples of such fillers include carbon black, calcium carbonate, clay, silica, and the like. With respect to processing materials, various processing oils, waxes and the like intended to improve the processing of the material may be included in any concentration that does not significantly detract from the properties of the TPO.

The polymer may also be formulated with stabilizers, pigments and antioxidants to obtain the appropriate weathering properties. In addition, flame retardant fillers such as aluminum trihydrate (ATH), magnesium trioxide, calcium carbonate, mica, talc, or glass may be added. In one embodiment, filler levels can range from 0 to about 30% by weight.

A typical TPV is a melt blend or reactor blend of a polyolefin plastic, typically a propylene polymer, with a crosslinked olefin copolymer elastomer (OCE), typically an ethylene-propylene rubber (EPM) or an ethylene-propylene-diene rubber (EPDM). In those TPV's made from EPDM, the diene monomer utilized in forming the EPDM terpolymer is preferably a non-conjugated diene. Illustrative examples of non-conjugated dienes which may be employed are dicyclopentadiene, alkyldicyclopentadiene, 1,4-pentadiene, 1,4-hexadiene, 1,5-hexadiene, 1,4-heptadiene, 2-methyl-1,5-hexadiene, cyclooctadiene, 1,4-octadiene, 1,7-octadiene, 5-ethylidene-2-norbornene, 5-n-propylidene-2-norbornene, 5-(2-methyl-2-butenyl)-2-norbornene and the like.

As explained in greater detail herein, in the final composite extrusion, such as incorporated into a door or window assembly, the at least two polymeric components making up the abrasion resistant decorative layer are both at least partially crosslinked (the elastomer rubber in the TPV and the crosslinkable olefin polymer). Thus, although much of the description herein refers to the abrasion resistant decorative layer as comprising crosslinkable polymeric materials (as noted above), it will be understood that in its preferred final manufactured form, the composite extrusion of the present invention utilizes an abrasion resistant decorative layer that comprises at least partially crosslinked materials.

The second component of the abrasion resistant decorative layer 4 is a crosslinkable olefin polymer. This may include homopolymers, olefin copolymers (copolymers of a polyolefin with another polyolefin or other polymer), or blends of such polymers. In a preferred embodiment, the crosslinkable olefin polymer is a crosslinkable olefinic homopolymer, particularly polyethylene. Preferred crosslinkable olefinic homopolymers are those that can be crosslinked by silane grafting. Electron beam radiation crosslinking is not preferred because of its expense. Likewise, peroxide crosslinking is not preferred because of the processing concerns that it entails. However, it is contemplated that the present invention weather strip and related methods could utilize such techniques for crosslinking. A preferred crosslinkable olefin polymer is a silane-grafted polyethylene, and this will be used as an example in the present discussion.

Other suitable olefinic homopolymers for use with the TPV in the abrasion resistant decorative layer include silane grafted polypropylene, and higher olefin homopolymers. The homopolymers can be made via a variety of polymerization systems (including metallocene catalyzed and conventional catalysis systems) and have a range of molecular weights and other characteristics. In one preferred embodiment, the homopolymer is a polyethylene having a $M_n$ of from about 20,000 to 100,000, a $M_w$ of from about 50,000 to 200,000 and a molecular weight distribution of from about 2.5 to 4.0.

One stage silane crosslinking involves the extrusion of a direct mixture of the polymer resin with a silane concentrate that includes a catalyst. The extrudate is subsequently crosslinked in the presence of water. In two-stage crosslinking, silane is first grafted to the polymer molecular chains according to known reactions to yield a silane grafted copolymer.

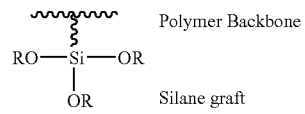

Subsequently, the silane-grafted copolymer is mixed with a silanol condensation catalyst and then exposed to water to effect crosslinking of the copolymer in a two step reaction. First, the water hydrolyzes the silane to produce a silanol. The silanol then condenses to form intermolecular, irreversible Si—O—Si crosslink sites.

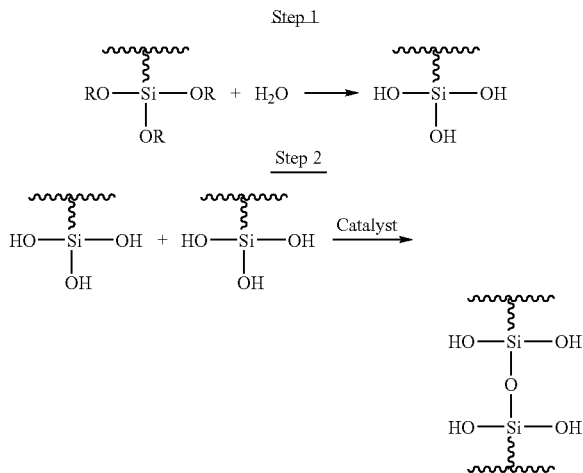

The amount of crosslinked silane groups, and thus the final polymer properties, can be regulated by controlling the production process, including the amount of catalyst used. A gel test (ASTM D2765) is used to determine the amount of crosslinking. In one embodiment and prior to being crosslinked, the polyethylene or other olefin polymer preferably has a melt flow index determined according to ASTM D-1238 of about 0.5-20 g/10 min at 190° C. and 2.16 kg load and a Shore A hardness of about 50-90. Most preferably, it exhibits a melt flow index of about 0.7-1.2 g/10 min at 190° C. with a 2.16 kg load, a Shore A hardness of about 70 and a density of about 0.8-1.2 g/cm$^3$.

The catalyst can be any of a wide variety of materials that are known to function as silanol condensation catalysts including many metal carboxylates and fatty acids. A preferred catalyst is dibutyltindilaurate.

In one embodiment, the abrasion resistant decorative layer preferably includes about 75% to about 87% by weight of the TPV and from about 9% to about 15% by weight of the crosslinkable olefin polymer. The abrasion resistant decorative layer can also contain conventional additives including, but not limited to, organic and inorganic fillers, plasticizers, slip agents, UV stabilizers, antioxidants and, as previously mentioned, coloring agents in an amount up to about 30%, more preferably about 2-5%.

In one embodiment, a slip agent or other lubricant is added to the blend prior to processing. Any conventional slip agent material may be utilized. Preferred slip agents include polysiloxane slip agents known in the art. The use of such slip agents reduces the coefficient of friction of the resulting show layers such that the use of a separate slip coating on the surface of the finished product is not necessary, resulting in reduced labor and expense. Such slip agents may generally be present in an amount of from about 0.1-20.0% by weight, more typically from about 2.0-8.0%.

In addition, the use of a coloring agent in the blend allows one to customize the color of the surface of the final weather strip to match or complement the color of the vehicle or its interior. The ability of the blend to retain color and gloss is superior to that of conventional elastomeric rubbers.

The TPV and the crosslinkable olefin polymer are preferably pre-blended prior to depositing on the elastomer main body member. Thus, in one embodiment, the TPV and crosslinkable olefin polymer may be pre-blended and extruded into pelletized form. Preferably, the material is dried to eliminate moisture that may start the crosslinking process of the olefin polymer. The pre-blended mixture may then be mixed with a crosslinking catalyst in a suitable amount (for example 2-7% by weight) prior to its extrusion onto the elastomer main body member.

Subsequently, the abrasion resistant decorative layer 4 can be applied to the main body member 2 in one of several different ways. For ease of description, the different processes will be described utilizing a two stage crosslinkable, silane-grafted polyethylene homopolymer blended with a TPV as the abrasion resistant decorative layer 4 and EPDM as the thermoset elastomer rubber main body member 2. However, the present invention contemplates the use of other crosslinkable olefin polymers in the abrasion resistant decorative layer 4 and other elastomers in the main body member 2.

As noted above, the elastomer main body member and abrasion resistant decorative layer may be extruded, molded, or otherwise processed in a variety of ways known in the art. Several different extrusion methods are described below. These are not intended to be limiting however, and other methods of producing the final composites are also contemplated, such as, e.g., compression or injection molding.

Figure 5:
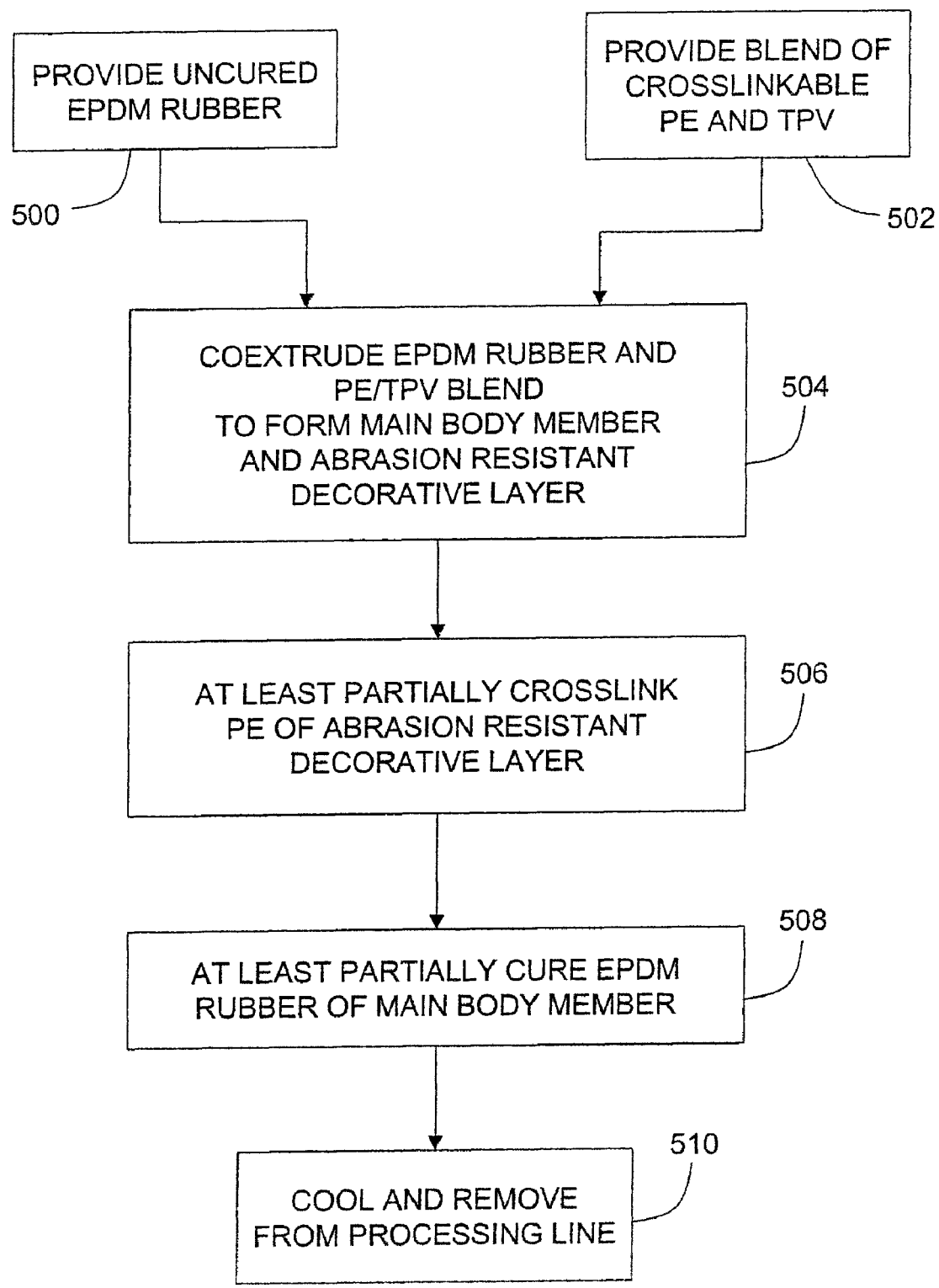
FIG. 5 is a flowchart depicting the main processing steps in the first preferred technique of the invention detailed in FIG. 2.

The present invention provides a first preferred technique for producing a composite extrusion by co-extruding an uncured EPDM main body member, such as item 2 in FIG. 1, and an uncrosslinked silane-grafted polyethylene/TPV abrasion resistant decorative layer, such as item 4 in FIG. 1, through an extrusion die. With reference to FIG. 5, a schematic diagram is shown outlining the preferred processing steps in this first preferred technique. Briefly, an uncured EPDM rubber and crosslinkable polyethylene/TPV blend are provided 500, 502. The EPDM rubber and the PE/TPV blend are coextruded 504 to form a main body member and an abrasion resistant decorative layer, respectively. Subsequently, the polyethylene in the blend is at least partially crosslinked 506. The EPDM rubber of the main body member is then at least partially cured 508 prior to removal of the assembly from the processing line 510.

Figure 2:
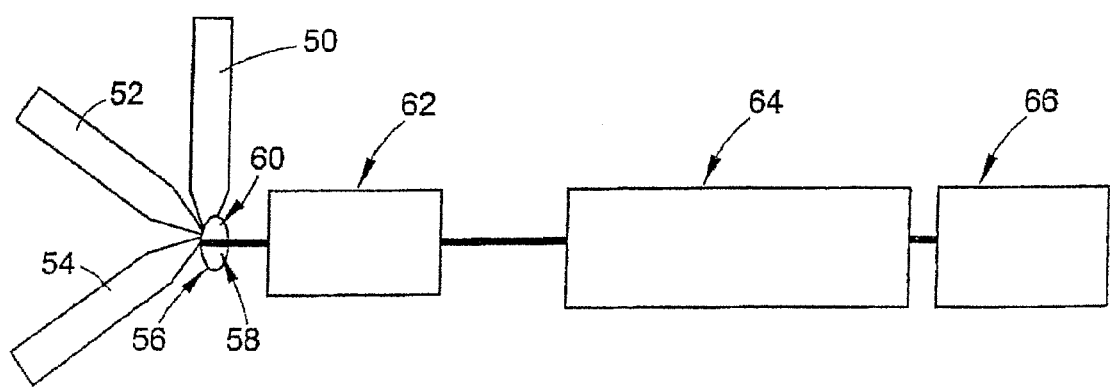
FIG. 2 is a depiction of a first preferred technique of the present invention for manufacturing a composite extrusion suitable for use as weather strip for a vehicle.

With greater detail and with further reference to FIG. 2, a first extruder 50 for processing a blend of a silane-grafted crosslinkable polyethylene and a TPV, a second extruder 52 for processing a sponge EPDM and a third extruder 54 for processing a dense EPDM are placed in communication with an extrusion die 56. The term "sponge EPDM" refers to an EPDM that contains blowing agents. The term "dense EPDM" refers to an EPDM that does not contain any blowing agents. For ease of description, the production process will be described using the dense extruder 54, although in actual practice both are typically used concurrently, depending on the application. In order to ensure sufficient flow of the EPDM compound for subsequent extrusion, the EPDM extruder 54 is preferably maintained at a temperature of from about 70° C. to about 85° C. For the same reason, the PE/TPV extruder 50 is preferably maintained at about 130° C. to about 210° C. The extrusion die 56 is preferably maintained at about 110° C. on an EPDM side 58 and from about 200° C. to about 260° C. on an PE/TPV side 60. Insulation (not shown) between the two sides of the extrusion die allows for this disparity in temperatures to be more easily achieved. For a dense EPDM, the EPDM is extruded at a pressure of from about 2000 to about 5000 psi, and most preferably about 4000 psi. For a sponge EPDM, the EPDM is extruded at a pressure of about 1000 psi to about 3000 psi, most preferably about 2500 psi. The PE/TPV and EPDM are co-extruded such that the PE/TPV layer mechanically bonds with the EPDM through molecular chain inter-diffusion and entanglement. The thickness of the resulting PE/TPV layer is preferably from about 0.1 to about 1.5 mm, and typically about 0.5 mm.

Referring further to FIG. 2, the composite extrusion (not shown) comprising the extruded EPDM and PE/TPV is then passed through a steam bath 62 to effect crosslinking of the polyethylene in the PE/TPV layer. The steam bath 62 is preferably maintained at a temperature of from about 100° C. to about 110° C. To cure the EPDM, the composite extrusion is then passed through an oven 64 or other curing device at a temperature of from about 180° C. to about 270° C., depending on the grade of EPDM used in the main body member 2. In a particularly preferred embodiment, the composite extrusion is passed through a number of temperature zones in the oven 64 starting at about 200° C. for about 15 to about 50 seconds, ramping up to about 220° C. for about 45 seconds to about 2.4 minutes, and then ramping down to about 210° C. for about 15 to about 50 seconds, prior to exiting the oven 64. Preferably, the total oven cure time is between about 1 minute and about 4 minutes. The composite extrusion is then cooled in a water or air cooling tank 66 at about 30° C. to 90° C., and most preferably about 60° C., before removing the composite extrusion from the manufacturing line.

Figure 6:
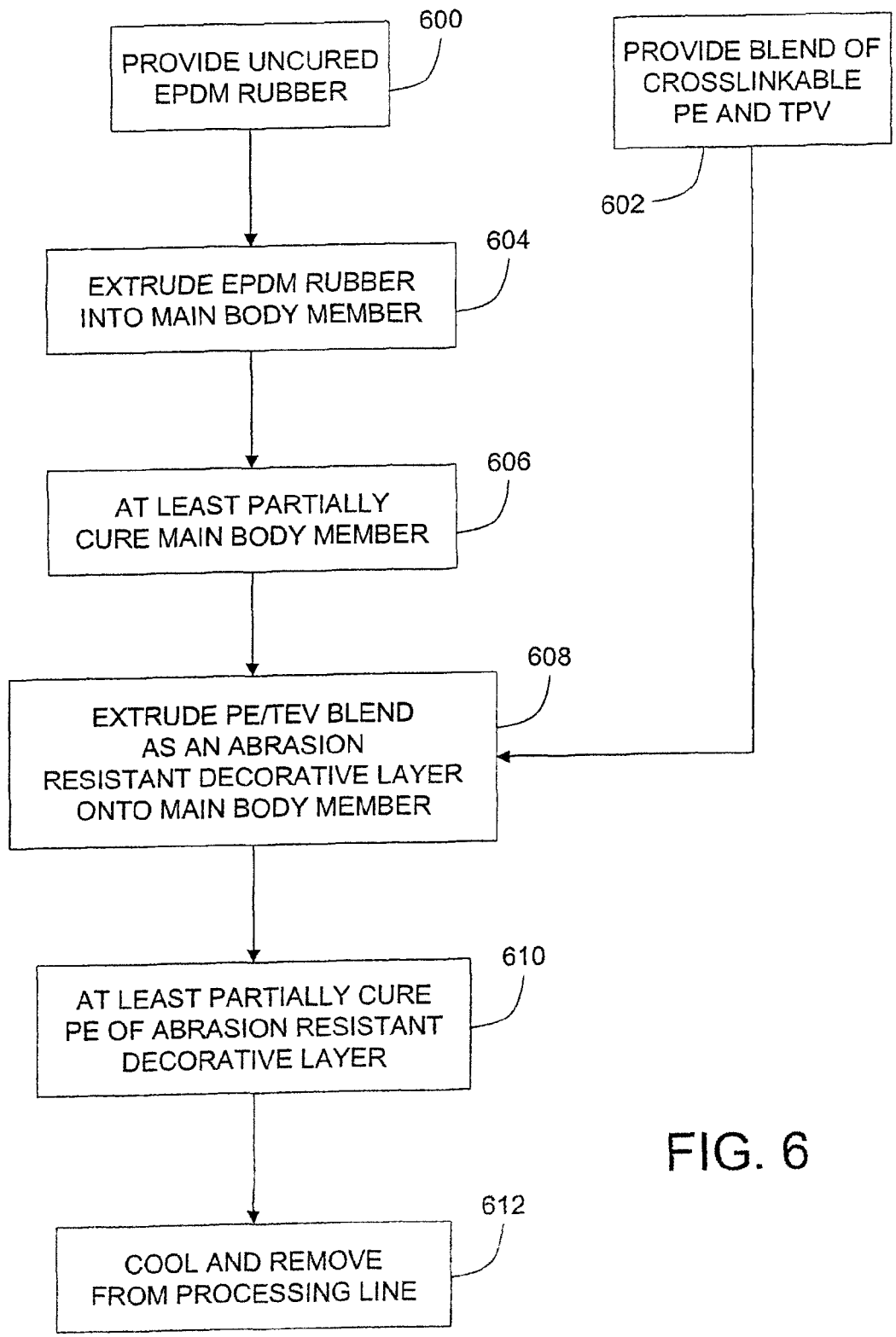
FIG. 6 is a flowchart depicting the main processing steps in the second preferred technique of the invention detailed in FIG. 3.

In a second preferred technique in accordance with the present invention, the uncured PE/TPV is extruded onto the main body member after the EPDM has been at least partially cured. With reference to FIG. 6, a schematic diagram is shown outlining the processing steps in this third preferred technique. Briefly, an EPDM rubber and crosslinkable PE/TPV are provided 600, 602. The EPDM rubber is extruded 604 into a main body member and the main body member is subsequently at least partially cured 606. The PE/TPV is extruded 608 as an abrasion resistant decorative layer onto the main body member. The PE of the PE/TPV abrasion resistant layer is crosslinked 610 prior to removal 612 of the assembly from the processing line.

With additional detail and with further reference to FIG. 3, an extruder 52 for sponge EPDM and an extruder 54 for dense EPDM are placed in communication with a first extrusion die 70. For ease of description, the production process will be described using only the dense extruder 54, although in actual practice both are typically used concurrently to make different sections of the same part. EPDM is extruded from the rubber extruder 54 through the first die 70 to form a main body member (not shown). The main body member is then passed through an oven 64 to cure the EPDM. Upon emerging from the oven 64, an abrasion resistant layer (not shown) comprising the above described PE/TPV is extruded from a second die 72 that is fed by a plastic extruder 50 onto the cured main body member to form a composite extrusion. The residual heat of the EPDM main body member mechanically bonds the PE/TPV therewith through diffusion. An embossing wheel 74 assists in bonding the EPDM to the PE/TPV by pressing the two layers together. In addition, the embossing wheel 74 may be used to print surface patterns on the composite extrusion (such as a "leather-like" texture). The composite extrusion is passed through a water cooling bath 62 to cool the composite and to crosslink the polyethylene of the PE/TPV prior to removal 76 from the manufacturing line. The temperatures and pressures for the second technique are preferably similar to those used for the first technique in all respects except that the first die 70 is at a temperature from about 100° C. to about 120° C., and the second die 72 is at a temperature from about 200° C. to about 220° C. In addition, although not typically independently heated, the embossing wheel 74 may be at a temperature from about 170° C. to about 210° C., and typically about 195° C., due to the residual heat from the extrudate and the adjacent extruder(s).

Figure 7:
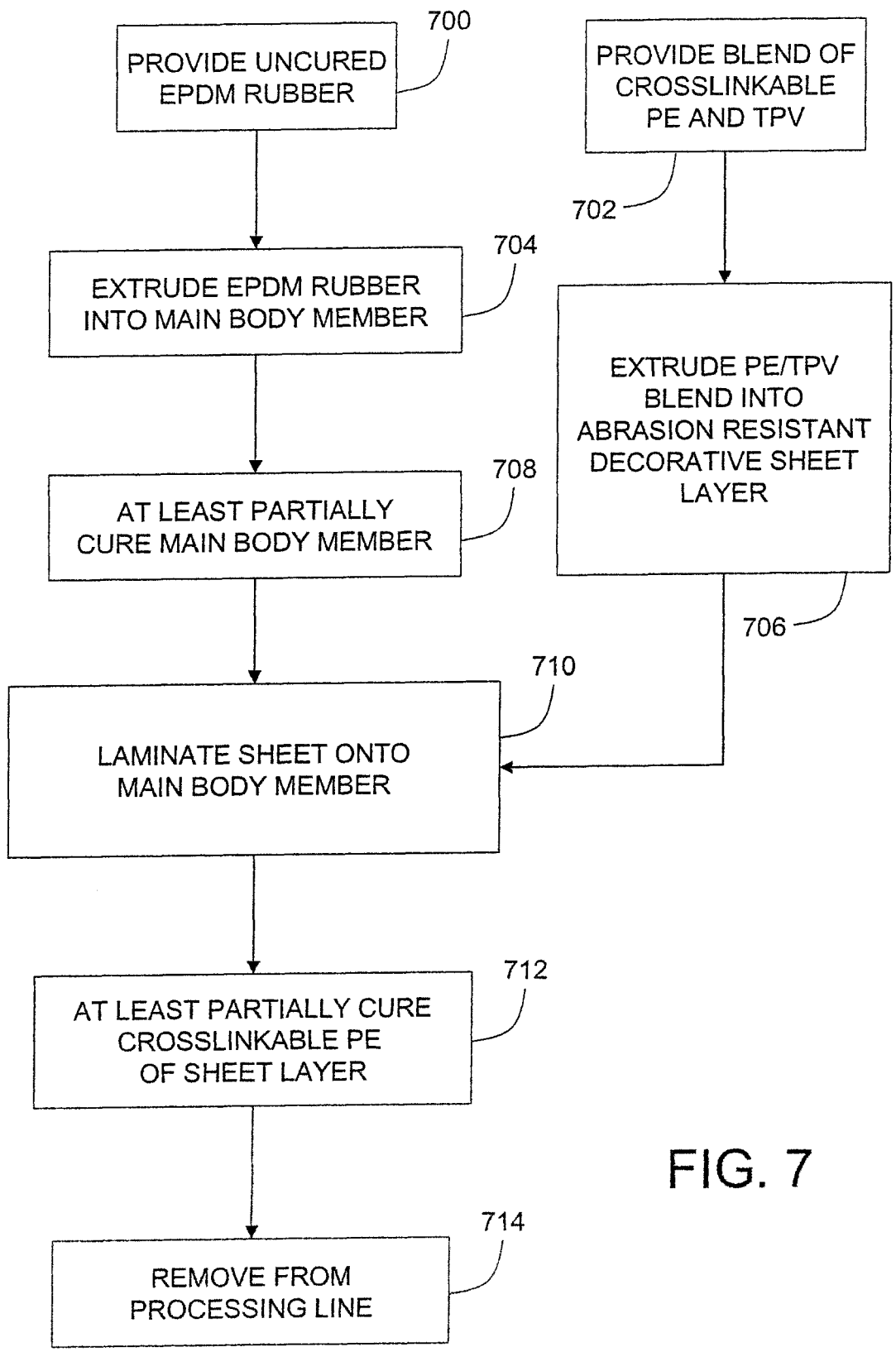
FIG. 7 is a flowchart depicting the main processing steps in the third preferred technique of the invention detailed in FIG. 4.

In a third technique, an uncured PE and TPV blend is extruded into a sheet and then laminated onto a cured EPDM main body member. With reference to FIG. 7, a schematic diagram is shown outlining the processing steps in this third preferred technique. Briefly, a thermoset elastomer rubber and the above described PE/TPV are provided 700, 702. The EPDM rubber is extruded 704 into a main body member and the PE/TPV is extruded 706 into an abrasion resistant decorative sheet layer. The main body member is at least partially cured 708 and the sheet layer then laminated 710 onto the main body member. The PE of the sheet layer is then at least partially crosslinked 712 before the resultant assembly is cooled and removed 714 from the processing line.

With additional detail and with further reference to FIG. 4, an extruder 52 for sponge EPDM and an extruder 54 for dense EPDM are placed in communication with a first extrusion die 70. As stated earlier, for ease of description, the production process will be described using the dense extruder 54, although in actual practice both are typically used concurrently. EPDM from the rubber extruder 54 is extruded through the first die 70 into a main body member (not shown). The main body member is passed through an oven 64 to cure it. PE/TPV is extruded from a second extruder 50 through a second die 82 to form an abrasion resistant layer in the form of a sheet 80. An embossing wheel 74 then bonds the uncured PE/TPV sheet 80 to the main body member to form a composite extrusion (not shown). The composite extrusion is then passed through a water bath 62 to crosslink the polyethylene component of the PE/TPV blend and to cool the composite prior to removal from the line 76. The temperatures and pressures for the third technique are preferably similar to those used for the first technique in all respects except that the first die 70 temperature is from about 100° C. to about 120° C., the second die 82 temperature is from about 200° C. to about 220° C. and the lamination wheel is at a temperature from about 170° C. to about 210° C., and preferably about 185° C.

While various changes and adaptations may be made to the above methods without departing from the scope of the invention, with regard to the first preferred technique described, it is preferable that the polyethylene of the PE/TPV blend is crosslinked prior to passing the composite extrusion through the oven.

EXAMPLES

The following examples are provided to better illustrate certain preferred embodiments. They should in no way be considered limiting of the scope of the invention. Various samples were prepared according to the above embodiments. The formulation of the abrasion resistant decorative layer for these samples are listed in table 1.

TABLE 1

| Material | Parts Sample 1 | Sample 2 |
|---|---|---|
| Santoprene 8211-35 [1] | 0.805 | 0.775 |
| Syncure S1054 [2] | 0.126 | 0.106 |
| MarkScreen 1413 [3] | 0.0051 | 0.0051 |
| Colorant | 0.03 | 0.05 |
| Siloxane additive | 0.0 | 0.05 |
| Crosslink accelerator | 0.0339 | 0.0339 |
| Total | 1.000 | 1.000 |

[1] An EPDM/PP TPV available from Advanced Elastomer Systems
[2] A moisture crosslinkable silane grafted polyethylene available from PolyOne Corp., Cleveland
[3] A UV stabilizer available from Crompton Corp., Hahnville, La.

The materials were blended in a Werner Pfleiderer 25 mm twin screw at 145° C. and processed in pelletized form. The material was then extruded as a one inch wide continuous strip through an extrusion die at 204° C. (400° F.). The properties of the material of sample 1 were as follows.

TABLE 2

| Hardness (Shore A) | 66 |
|---|---|
| Tensile at break (MPa) | 5.9 |
| Elongation at break (%) | 385 |
| 100% modulus (MPa) | 2.4 |
| Compression set | 28 |
| Tear Strength (kN/m) | 34 |
| Low temp brittleness (° C.) | −50 |
| Specific gravity | 0.91 |
| Ash (%) | 0 |
| Fogging | 88 |
| Oil swell (%) | 18.4 |
| 72 hrs at 90° C. | No tackiness, no oil migration |

In addition, the coefficient of friction of the present decorative layer is much lower than prior coatings used in such applications. As such, while prior automobile composites required a spray on slip-coating added to the finished part to reduce the coefficient of friction ("COF") to the desired range, the present decorative layers can achieve acceptable COF values without the addition of a separate slip-coating by the addition of siloxane to the formulation. To demonstrate, six formulations (formulations A-F) were prepared. A and B were conventional formulations containing a thermoplastic elastomer conventionally used as show layers for automobile weather strips with the addition of a colorant. They differ only in the fact that a spray on slip coating was added to B. Formulations C-E are embodiments of the present invention containing varying amounts of siloxane. The formulations of each sample are set forth below.

TABLE 3

| Formulations A + B | |
|---|---|
| Component | Weight % |
| Uncured styrenic block copolymer TPE (Kraton G7431) | 96.00 |
| Colorant | 4.00 |

A spray on slip coat was added to the finished part of formulation B. The composition of the present embodiments is set forth in Table 4 with values in wt. %.

TABLE 4

| Component | C | D | E | F |
|---|---|---|---|---|
| Sarlink X6145 | 77.96 | 74.37 | 68.22 | 71.20 |
| Syncure S1054A[1] | 12.23 | 11.67 | 12.06 | 11.17 |
| Syncure S1006B[2] | 3.38 | 3.23 | 3.33 | 3.09 |
| Colorant | 3.28 | 6.27 | 3.24 | 6.00 |
| UV Stabilizer | 0.80 | | 0.78 | |
| Siloxane | 2.35 | 4.46 | 12.37 | 8.54 |
| TOTAL | 100.00 | 100.00 | 100.00 | 100.00 |

[1] A moisture curable polyethylene available from PolyOne Corp.
[2] A catalyst masterbatch for the moisture curable PE Both the static and dynamic COF values were measured for all the finished parts according to ASTM D1894. The results are set forth in Table 5.

TABLE 5

| FORMULATION | Static | Dynamic |
|---|---|---|
| A | 2.949 | 3.491 |
| B | 0.322 | 0.317 |
| C | 1.245 | 1.973 |
| D | 1.285 | 2.06 |
| E | 1.534 | 2.016 |
| F | 1.427 | 1.834 |

As can be seen, the uncoated parts made according to the present formulations have a much lower COF than the uncoated prior art parts. Therefore, through the use of a siloxane additive to the composition of the show layer, static COF values down to about 1.2 or lower and typically between 1.2 and 1.6 may be obtained. Similarly, dynamic COF values of such layers may range down to about 1.9 or lower with typical values ranging from about 1.9 to 2.1. Although typically not as low as slip coated parts, the COF values obtainable for the present embodiments are acceptable for use in typical automobile applications without the need for an additional slip coat.

The invention has been described with reference to various preferred embodiments. Obviously, modifications and alterations will occur to others upon a reading and understanding of the specification. The invention is intended to include all such modifications and alterations insofar as they come within the scope of the appended claims and the equivalents thereof. Thus, for example, composite extrusions for other parts (such as automobile glass run channels) in addition to vehicle weather strips can be manufactured by the techniques of the present invention.

What is claimed is:

1. A wear resistant composite suitable for use as a vehicle weather strip comprising an abrasion resistant decorative layer, wherein said abrasion resistant decorative layer comprises a blend of polyolefin thermoplastic comprising a moisture crosslinkable olefin homopolymer that is at least partially crosslinked and a thermoplastic vulcanizate comprising a crosslinked elastomer and a polyolefin, the abrasion resistant decorative layer bonded to and disposed immediately adjacent an elastomer polymer main body member, and wherein the at least partially cross-linked polyolefin thermoplastic and the thermoplastic vulcanizate are different materials.

2. The composite according to claim 1, wherein said crosslinked polyolefin is a moisture crosslinkable silane grafted polyethylene.

3. The composition according to claim 1, wherein said wherein said blend comprises from about 75% to about 87% by weight of said TPV and from about 9% to about 15% by weight of said crosslinkable polyolefin.

4. The composite according to claim 1, wherein said elastomer polymer is a thermoset elastomer rubber.

5. The composite according to claim 4, wherein said thermoset elastomer rubber is an EPDM rubber.

6. The composite according to claim 1, wherein said abrasion resistant decorative layer is a sheet member.

7. The composite according to claim 6 wherein said sheet member is laminated and bonded to said main body member.

8. The composite according to claim 1, wherein the thickness of said abrasion resistant layer is from about 0.1 to about 1.5 mm.

9. The composite according to claim 8, wherein the thickness of said abrasion resistant layer is about 0.5 mm.

10. The composite according to claim 1, wherein said abrasion resistant decorative layer comprises a slip agent.

11. The composite according to claim 1, wherein said slip agent comprises a polysiloxane.

12. The composite according to claim 11, wherein said layer has a dynamic coefficient of friction of between 1.8 and 2.1.

13. A wear resistant composite suitable for use as a vehicle weather strip comprising an abrasion resistant decorative layer comprising a blend of a crosslinked thermoplastic polyolefin comprising a moisture crosslinkable olefin homopolymer, a thermoplastic vulcanizate comprising a crosslinked elastomer and a polyolefin, and a slip agent, bonded to an at least partially cured thermoset elastomer rubber main body member, wherein said abrasion resistant decorative layer has a static coefficient of friction of between 1.2 and 1.6, and wherein the cross-linked thermoplastic polyolefin and the thermoplastic vulcanizate are different materials.

14. A wear resistant composite according to claim 13, wherein said slip agent comprises a polysiloxane.

\* \* \* \* \*